United States Patent
Ankel et al.

(10) Patent No.: US 8,345,613 B2
(45) Date of Patent: Jan. 1, 2013

(54) ENHANCED UL RATE VIOLATION DETECTION

(75) Inventors: Pär Ankel, Nödinge (SE); Rikard Käer, Göteborg (SE); Andreas Andersson, Landvetter (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 287 days.

(21) Appl. No.: 12/682,321

(22) PCT Filed: Oct. 9, 2007

(86) PCT No.: PCT/EP2007/060719
§ 371 (c)(1), (2), (4) Date: Apr. 9, 2010

(87) PCT Pub. No.: WO2009/046760
PCT Pub. Date: Apr. 16, 2009

(65) Prior Publication Data
US 2010/0240383 A1  Sep. 23, 2010

(51) Int. Cl.
*H04W 72/00* (2009.01)
(52) U.S. Cl. ........ 370/329; 370/328; 370/335; 370/342; 455/452.1; 455/450; 455/422
(58) Field of Classification Search ............ 370/329, 370/328, 318, 335, 342; 455/452.1, 452.2, 455/522, 450
See application file for complete search history.

(56) References Cited

U.S. PATENT DOCUMENTS

| | | | |
|---|---|---|---|
| 6,690,655 B1 * | 2/2004 | Miner et al. | 370/278 |
| 7,003,310 B1 * | 2/2006 | Youssefmir et al. | 455/522 |
| 7,599,707 B2 * | 10/2009 | Zhang et al. | 455/522 |
| 2003/0207699 A1 * | 11/2003 | Shpak | 455/525 |
| 2003/0210668 A1 | 11/2003 | Malladi et al. | |
| 2004/0114574 A1 | 6/2004 | Zeira et al. | |
| 2005/0243762 A1 * | 11/2005 | Terry et al. | 370/328 |
| 2005/0243767 A1 * | 11/2005 | Zhang et al. | 370/329 |
| 2006/0268798 A1 * | 11/2006 | Kim et al. | 370/338 |
| 2006/0286994 A1 * | 12/2006 | Kwak et al. | 455/522 |
| 2007/0109964 A1 * | 5/2007 | Kwak et al. | 370/230 |
| 2008/0089296 A1 * | 4/2008 | Kazmi et al. | 370/336 |
| 2009/0086671 A1 * | 4/2009 | Pelletier et al. | 370/329 |

FOREIGN PATENT DOCUMENTS

| | | |
|---|---|---|
| WO | WO 2005/112487 A | 11/2005 |
| WO | WO 2006/081874 A1 | 8/2006 |

* cited by examiner

*Primary Examiner* — Ricky Ngo
*Assistant Examiner* — Rasheed Gidado

(57) ABSTRACT

The present invention relates to a method for grant violation detection in an enhanced uplink (UL) telecommunication system. According to the method a radio network controller (RNC) establishes a first enhanced UL transport channel (E-DCH) which enables uplink data traffic with a certain data rate from a user terminal UE at least to a first base station. At least a first downlink transmission is performed to the user terminal UE including a first E-DCH. A Node B NB detects the scheduled data rate on which the user terminal UE transmits and further controls if the scheduled data rate detected is higher than the maximum data rate defined by the first E-DCH channel scheduled grant. If this is the case the Node B NB performs at least a second following downlink transmission including the first E-DCH channel scheduled grant.

15 Claims, 6 Drawing Sheets

ENHANCED UL RATE VIOLATION DETECTION

TECHNICAL FIELD

The present invention relates to a method and a telecommunication system for grant violation detection, and Node B and a radio network controller in the system enabling said method.

BACKGROUND

There is an increasing need of delivering wireless technology with broadband capacity for cellular networks. A good broadband system must fulfil certain criteria, such as high data rate and capacity, low cost per bit, good Quality of Service and greater coverage. High Speed Packet Access (HSPA) is an example of a network access technology that enables this.

HSPA is a collection of protocols which improves the performance of existing Universal Mobile Telecommunication Systems (UMTS), which is a third generation (3G) cell phone technology. UMTS uses Wideband Code Division Multiple Access (WCDMA) as air interface for the radio-based communication between user equipment (UE), in form of a mobile terminal, and the base station (BS). The air interface in the Open Systems Interconnection (OSI) model comprises layers 1 and 2 of the mobile communications system, establishing a point-to-point link between the UE and a radio access node (RAN).

WCDMA is a wideband spread-spectrum air interface that utilizes the direct sequence Code Division Multiple Access (CDMA) signaling method to achieve higher speeds and support more users. Key features for WCDMA are:

Two 5 MHz radio channels for Uplink (UL) and Downlink (DL) channels respectively.
Support two basis duplex modes, Frequency division (FDD) and Time division (TDD).

HSPA is an integral part of WCDMA. Wide-area mobile coverage can be provided with HSPA. It does not need any additional spectrum or carriers. Currently, WCDMA can provide simultaneous voice and data services to users on the same carrier. This also applies to HSPA which means that spectrum can be used efficiently. Simulations show that in a moderately loaded system, HSPA can largely reduce the time it takes to download and to upload large files.

HSPA provides greater system capacity by for instance:
Shared-channel transmission resulting in efficient use of available code and power resources in WCDMA in the downlink (DL).
Fast scheduling prioritizing users with the most favourable channel conditions.
16 Quadrature Amplitude Modulation (QAM) in the DL and the uplink (UL) (as an option 64 QAM for the DL) which results in higher bit-rates.

The primary benefits of HSPA are improved end-user experience. In practice, this means shorter UL and DL times as a result of higher bit-rates and reduced latency compared to earlier releases of WCDMA. HSPA also benefits operators by reducing the production cost per bit. More users can be served with higher bit-rates at lower production costs.

As with any telecommunication technology, end-user performance with HSPA depends of the type of service and the behavior of higher-layer application protocols. Transmission Control Protocol (TCP) used for packet data services includes slow start and mechanisms which influence the performance, and the overall performance of the service much include these mechanisms. For instance in web-browsing it could be TCP and not HSPA as air interface that limits the performance. In contrast to web-browsing, TCP has very low impact on the time to download a large file, which means the performance is largely determined by the data rate of the radio link. A single user downloading a large file can occupy a significant amount of the total cell capacity.

HSPA is the set of technologies defining the migration path of WCDMA operators worldwide. The two existing features, High Speed Downlink Packet Access (HSDPA) and High Speed Uplink Packet Access (HSUPA), in the HSPA family provides the increased performance by using improved modulation schemes and by refining the protocols by which handsets and base stations communicate. These improvements lead to the better utilization of the existing radio bandwidth provided by UMTS.

High Speed Downlink Packet Access (HSDPA) is the first feature within HSPA. It is part of the WCDMA Third Generation Partnership Project (3GPP) Release 5 specification. HSDPA provides a new downlink transport channel that enhances support for high-performance packet data applications. It represents the first step in the evolution of WCDMA performance. HSDPA can deliver an up to 35 fold increase in downlink data rates of standard WCDMA networks, enabling users to access the Internet on mobile phones and laptops, at speeds previously associated with fixed line DSL.

HSDPA is based on shared channel transmission, which means that some channel codes and the transmission power in a cell are seen as a common resource that is dynamically shared between users in the time and code domains for a more efficient use of available codes and power resources in WCDMA. The radio channel conditions experienced by different downlink communication links vary significantly, both in time and between different positions in the cell.

To compensate for rapidly varying radio conditions in the downlink, HSDPA relies on bit-rate adjustment. That is, while keeping transmission power constant, it adjusts (by lowering) the data rate by adjusting the modulation.

High Speed Uplink Packet Access (HSUPA) is the second feature within HSPA. It is part of the WCDMA Third Generation Partnership Project (3GPP) Release 6 specification. HSUPA provides a new uplink (UL) transport channel called Enhanced Dedicated CHannel (E-DCH). HSUPA dramatically increases the uplink data traffic rate. This technology is likely to significantly increase the amount of data uploaded over mobile networks, especially user-generated content. Although a lot of is downlink oriented, there are still quite a number of applications that will benefit from an improved uplink. These include the sending of large e-mail attachments, pictures, video clips, blogs etc. HSUPA is also known as Enhanced UL.

In contrast to HSDPA, the new uplink channel that is introduced for Enhanced Uplink is not shared between users, but is dedicated to a single user.

FIG. 1 shows a HSUPA network overview. A user terminal UE communicates with the core network CN via at least one base station 11. The system further comprises a second base station 10 with a corresponding system which will be described later. A first radio network controller RNC 12 establishes an E-DCH which enables uplink data traffic from the user terminal to the base station. The E-DCH carries data for at least one radio network bearer. The term "Iu" in FIG. 1 represents the interface between RNC and core network. Sometimes the abbreviations Iu-ps and Iu-cs are used to indicate connection to packet switched or circuit switched core networks. The term "Iub" represents the interface between RNC and the radio bases station (RBS).

Several new physical channels are added to provide and support high-speed data transmission for the E-DCH. As shown in FIG. 1, two new code-multiplexed uplink channels are added:

E-DCH Dedicated Physical Data Channel (E-DPDCH)
E-DCH Dedicated Control Channel (E-DPCCH)

E-DPDCH carries the payload data, and the E-DPCCH carries the control information associated to the E-DPDCH. E-DPDCH is used to carry the E-DCH transport channel. There may be zero, one or several E-DPDCH on each radio link wherein there is at most one E-DPCCH on each radio link.

E-DPDCH and E-DPCCH are always transmitted simultaneously. E-DPCCH shall not be transmitted in a slot unless E-DPDCH is also transmitted in the same slot.

Similarly, three new channels, see FIG. 1, are added to the downlink for control purposes:

E-DCH Hybrid Automatic Repeat Request (HARQ) Indicator Channel (E-HICH) carrying the uplink E-DCH hybrid Acknowledgement (ACK) and Negative ACK (NACK) indicator. The Node B can request retransmissions of erroneously received data packets and will send for each packet either an acknowledgement (ACK) or a negative acknowledgement (NACK) to the UE.

E-DCH Absolute Channel (E-AGCH) carrying absolute grants, which means that it provides an absolute limitation of the maximum amount of uplink resources the UE may use. It is a fixed rate downlink physical channel carrying the uplink E-DCH absolute grant.

E-DCH Relative Grant Channel (E-RGCH) carrying the uplink E-DCH relative grants, which means that it controls the resource limitations by increasing or decreasing the limitations with respect to the current serving grant. The relative grants (RG) are used in the scheduling process to incrementally adjust the allowed UE transmit power. A UE can receive and combine one relative grant from all the E-RGCHs transmitted within the serving radio link set.

The E-DCH Transmission Time Interval (TTI) can be either 2 ms or 10 ms in length. E-AGCH is only transmitted from the serving cell. E-RGCH and E-HICH are transmitted from radio links that are part of the serving radio link set and from non-serving radio links.

As shown in FIG. 1 the same E-DCH can be provided both through the first RNC 12 for the serving cell and through a second RNC (RNC2) 13 for the non-serving cell. The second RNC 13 serves a separate base station 10 with a Node B NB2 and an enhanced UL scheduler (EUL-S2) (will be described later). Except for E-AGCH (which can only be transmitted through the serving cell) all the physical channels can be transmitted through either of the cells. As an alternative one RNC can serve both a serving cell and a non-serving cell. The term "Iur" in FIG. 1 represents the interface between the first RNC 12 and the second RNC 13. Only one RNC will communicate with the core network (i.e. the first RNC). The first RNC is in control of the connection and handles things like soft HO.

The RNC can take the role of serving or drifting. These does not relate to the concept of serving cell or serving radio link RL. The serving RNC is the RNC which acts as the "anchor point" between the radio access network RAN (the radio base station and Node B) and the CN. The serving cell is the best cell in the active set according to some criteria and can belong either to the serving (S-RNC) or the drifting (D-RNC) RNC.

Note that HSUPA channels are added on top of uplink/downlink dedicated channels. Each UE therefore additionally carries an uplink and downlink dedicated physical channel (DPCH), see FIG. 1. In the downlink, a fractional dedicated channel (F-DPCH) can be used alternatively. The F-DPCH carries control information and is a special case of downlink Dedicated Physical Control Channel (DPCCH). UL might only contain the DPCCH as in FIG. 1. It could also contain a Dedicated Physical Data Channel (DPDCH). These have been introduced in 3GPP release 6 in order to optimize the downlink codes usage.

HSUPA scheduling is provided by an enhanced UL scheduler (EUL-S) located in the Node B, see FIG. 1, close to the air interface, but it operates on a request-grant principle where the UE requests a permission to send data and the scheduler decides when and how much data an UE is allowed to send and also how many UEs will be allowed to do so. The EUL-S is located in the Node B in order to move processing closer to air interface and be able to react faster on the radio link situation.

The fast scheduling is used in HSUPA enables rapid resource reallocation between UEs, exploiting the 'burstiness' in packet data transmissions. Tasks of the uplink scheduler are to control the uplink resources that the UE in the cell are using. The scheduler therefore grants maximum allowed HSUPA transmission. This effectively limits the transport block size the UE can select and thus the uplink data traffic rate. It enables the system to admit a larger number of high-data rate users and rapidly adapts to interference variations—leading to an increase both in capacity and the likelihood that a user will experience high data rates.

The scheduling mechanism is based on absolute and relative grants. The absolute grants are used to initialize the scheduling process and provide absolute transmit power ratios to the UE, whereas the relative grants are used for incremental up- or downgrades of the allowed transmit power. The absolute grant is carried by the downlink physical channel E-AGCH and the relative grant is carried by the downlink physical channel E-RGCH. The grants are used as a maximum transmission limit on the uplink transmission channel E-DCH. The grants can be converted to the scheduled rate.

Different scheduling strategies can be implemented. This flexibility is useful, as different environments and traffic types can have different requirements on the scheduling strategy. A UE can, for instance, be scheduled from just one base station or from several base stations at the same time.

Macro diversity is exploited for HSUPA, i.e. the uplink data traffic packets can be received by more than one cell. There is one serving cell controlling the serving radio link assigned to the UE. The serving cell is having full control of the scheduling process and provides the absolute grant to the UE. The serving radio link set is a set of cells containing at least the serving cell and possibly additional radio links with common RG generation. The UE can receive and combine one relative grant from the serving radio link set. There can also be additional non-serving radio links. The UE can have zero, one or several non-serving radio links and receive one relative grant from each of them.

In addition to the scheduled mode of transmission (E-AGCH and E-RGCH) the standards also allows a self-initiated transmission mode from the UEs, named non-scheduled. The non-scheduled mode can, for example, be used for Voice IP (VoIP). The UE adjusts the data rate for scheduled and non-scheduled flows independently. The maximum data rate of each non-scheduled flow is configured at Radio Link Setup and/or Radio Link Reconfiguration procedure, and typically not changed frequently.

As a basic principle of the uplink scheduling mechanism, the UE maintains a serving grant which represents the maximum E-DPDCH power ratio the UE may use in the next transmission. The available uplink power determines the possible data rate. The absolute grant allows the Node B scheduler to directly adjust the granted rate of UEs under its control. It is used to initialize the serving grant. The relative grants are used to incrementally adjust the UE's serving grants. As an input to the scheduling, UE feedback is required. The UE has the possibility to send scheduling information which provides detailed information about the buffer status in the UE. Therefore, the Node B scheduler can make appropriate scheduling decisions.

It happens that the UE does not obey its grant and thereby transmit at a too high data rate. This can happen for faulty UE or due to that the UE didn't detect the downlink E-AGCH and E-RGCH physical channels carrying the grant data. Moreover, the UE can always transmit the non-scheduled part according to network configuration and it is only the scheduled part that the Enhanced UL scheduler controls.

This is currently a problem in WCDMA Radio Access Network (RAN). UE sometimes transmit on too high rate, which causes disturbances in the cell. This rate is higher than the rate granted by the scheduler. The scheduler repeating the grant could help, if the UE hear the repeated grant. However, if it is transmitted on the same power level, it might fail again. Just increasing the downlink power every time the E-RGCH or E-AGCH is transmitted is too costly. Still, if the repeating of the grant does not help, something needs to be done with the UE, since the transmitting on a too high rate could seriously disturb the cell.

WO 2006/51867 discloses a mobile communication system in which the UE is instructed to lower the bit rate of E-DCH data channel when the received electrical power of E-DCH is too high. A non-serving cell sends an E-RGCH to instruct the UE to lower the transmission rate of E-DCH when received electric power of E-DCH is high. The problem with this system is that there is no method of handling a situation when the UE does not change the power after the E-RGCH has been sent.

SUMMARY

The object of the present invention is to solve the above problem by a method and a telecommunication system for grant violation detection, and an enhanced uplink scheduler and a radio network controller in the system enabling said method.

In order to solve the above-mentioned problems the present invention relates to a method for grant violation detection in an enhanced uplink telecommunication system. The system comprises at least one first base station for enabling wireless communication with at least one first user terminal. According to the method at least one first radio network controller establishes at least a first enhanced UL transport channel (E-DCH) which enables uplink data traffic with a certain data rate from the first user terminal at least to the first base station. The first E-DCH carries data for at least one radio access bearer. At least a first downlink transmission is performed to the first user terminal. The transmission includes a first E-DCH channel scheduled grant. The scheduled grant defines the maximum data rate limit for the uplink data traffic via the first E-DCH.

According to the method the first user terminal calculates from the received first E-DCH channel scheduled grant a scheduled data rate for the uplink data traffic via the first E-DCH. The first user terminal transmits the uplink data traffic on the first E-DCH with the calculated scheduled data rate. A Node B then detects the scheduled data rate on which the first user terminal transmits.

What particularly characterizes the method is that the Node B further controls if the scheduled data rate detected is higher than the maximum data rate defined by the first E-DCH channel scheduled grant. If the scheduled data rate detected is higher than the maximum data rate, the Node B performs at least a second following downlink transmission including the first E-DCH channel scheduled grant.

In order to solve the above-mentioned problems the present invention also relates to a Node B which is adapted for grant violation detection in an enhanced UL telecommunication system. The system further comprises at least one first base station for enabling wireless communication with at least one first user terminal.

At least a first enhanced UL transport channel (E-DCH) is established which enables uplink data traffic with a certain data rate from the first user terminal at least to the first base station. The first E-DCH carries data for at least one radio access bearer. At least a first downlink transmission is further performed to the first user terminal. The transmission includes a first E-DCH channel scheduled grant. The scheduled grant defines the maximum data rate limit for the uplink data traffic via the first E-DCH. The Node B is further adapted for detecting a scheduled data rate on which the first user terminal transmits uplink data traffic on the first E-DCH, What particularly characterizes Node B is that it is adapted to control if the scheduled data rate detected is higher than the maximum data rate defined by the first E-DCH channel scheduled grant. If the scheduled data rate detected is higher than the maximum data rate, the Node B is further adapted to perform at least a second following downlink transmission including the first E-DCH channel scheduled grant.

In order to solve the above-mentioned problems the present invention also relates to a first radio network controller (RNC) in an enhanced UL telecommunication system, which is adapted for grant violation detection. The system further comprises at least one first base station for enabling wireless communication with at least one first user terminal. The at least one first RNC is adapted for establishing at least a first enhanced UL transport channel (E-DCH) enabling uplink data traffic with a certain data rate from the first user terminal at least to the first base station. The first E-DCH carries data for at least one radio access bearer.

At least a first downlink transmission is further performed to the first user terminal. The transmission includes a first E-DCH channel scheduled grant. The scheduled grant defines the maximum data rate limit for the uplink data traffic via the first E-DCH. What particularly characterizes the first RNC is that it is further adapted for receiving a failure indication or a radiolink reconfiguration proposal sent to the first RNC after initiation by a Node B.

Finally, in order to solve the above-mentioned problems the present invention also relates to an enhanced uplink telecommunication system adapted for grant violation detection. The system comprises at least one first base station for enabling wireless communication with at least one first user terminal. An at least one first radio network controller is adapted to establish at least a first enhanced UL transport channel (E-DCH) which enables uplink data traffic with a certain data rate from the first user terminal at least to the first base station. The first E-DCH carries data for at least one radio access bearer. At least a first downlink transmission is performed to the first user terminal. The transmission includes a first E-DCH channel scheduled grant. The scheduled grant defines the maximum data rate limit for the uplink data traffic via the first E-DCH.

The first user terminal is adapted to calculate from the received first E-DCH channel scheduled grant a scheduled data rate for the uplink data traffic via the first E-DCH. The first user terminal is further adapted to transmit the uplink data traffic on the first E-DCH with the calculated scheduled data rate. A Node B is adapted to then detect the scheduled data rate on which the first user terminal transmits.

What particularly characterizes the system is that Node B is adapted to control if the scheduled data rate detected is higher than the maximum data rate defined by the first E-DCH channel scheduled grant. If the scheduled data rate detected is higher than the maximum data rate, the Node B is further adapted to perform at least a second following downlink transmission including the first E-DCH channel scheduled grant.

One advantage with the present invention is that the enhanced uplink scheduler performs following downlink transmissions which give the user terminal a new chance to detect the grant.

Another advantage is that in order to save downlink power, Node B does not use more power than necessary. When a grant violation has been detected, where it is assumed that the user terminal did not hear the downlink transmission, the downlink power level can be increased at the repeated following transmissions. This handling saves downlink power, which should as much as possible be used to downlink data, like dedicated physical channel (DPCH) and HSDPA. The alternative to always increase the downlink power will be costly.

A further advantage is that if the user terminal for some reason does not detect a relative or absolute grant despite the increased power, the terminal can be removed from E-DCH configuration and thereby not causes any further interference in the cell.

BRIEF DESCRIPTION OF DRAWINGS

In the following text the invention will be described in detail with reference to the attached drawings. These drawings are used for illustration only and do not in any way limit the scope of the invention.

DETAILED DESCRIPTION

Figure 1:
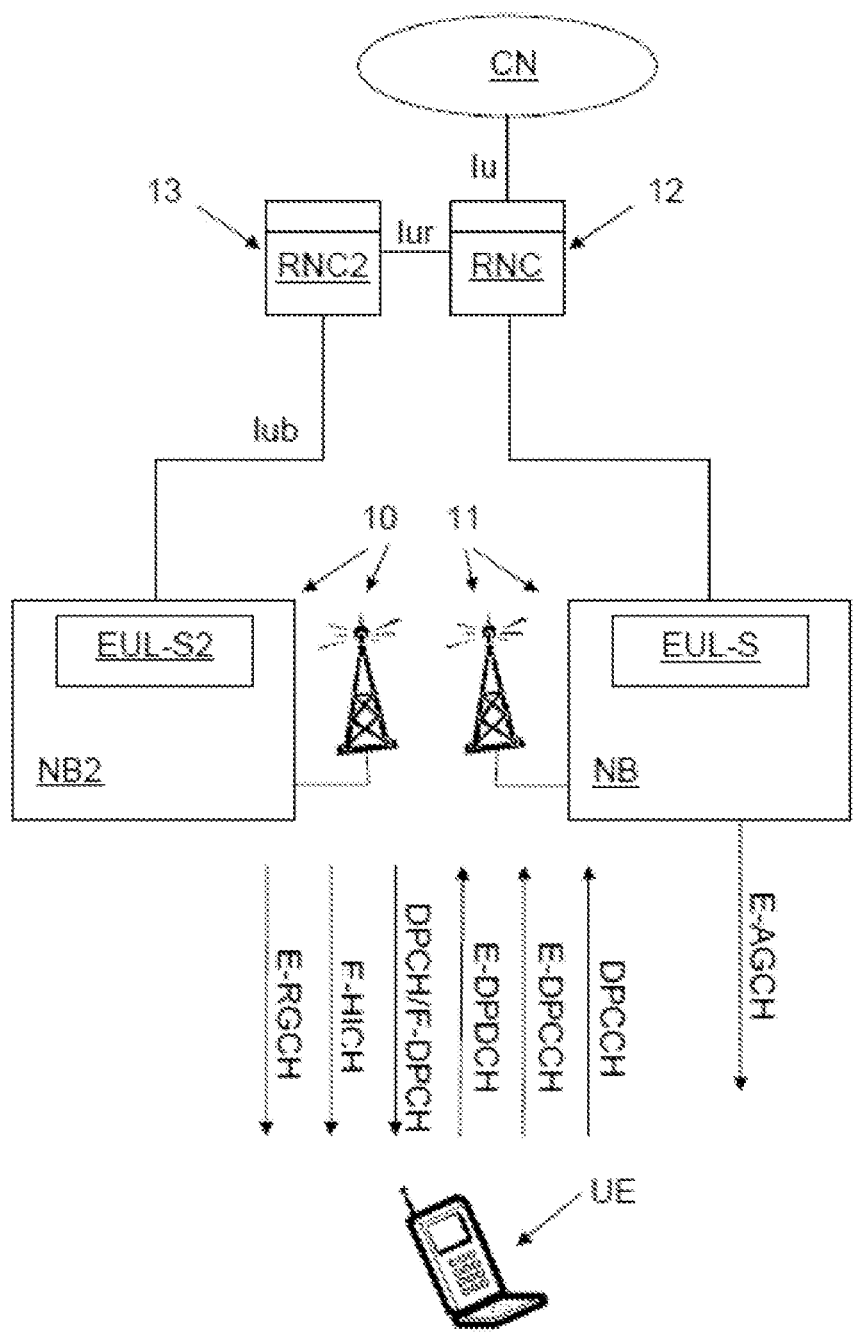
FIG. 1 shows a HSUPA network overview.

The invention will now be described in detail with reference to embodiments described in the detailed description and shown in the drawings.

The embodiments refer to a method and a telecommunication system for grant violation detection and a Node B and a radio network controller, in the system enabling said method. The system, Node B and the radio network controller in the system are adapted to perform the method steps as described in the method. It should be understood by a person skilled in the art that the fact the system and in particular the system parts perform a method step means that it is adapted to perform said step.

FIG. 1 shows a HSUPA network overview. A user terminal UE communicates with the core network CN via a base station 11. A first radio network controller RNC 12 establishes an E-DCH which enables uplink data traffic from the user terminal to the base station, the first E-DCH carrying data for at least one radio access bearer (RAB).

The present invention relates to a method for grant violation detection in an enhanced uplink (UL) telecommunication system, corresponding to a HSUPA system. The HSUPA system comprises at least one first base station 10 which enables wireless communication, with a first or more user terminals UE. The system further comprises a second base station 10 with a corresponding system which will be described later.

A first radio network controller RNC 12 establishes (more than one RNC can be involved) at least a first enhanced UL transport channel (E-DCH) which enables uplink data traffic with a certain data rate from the first user terminal UE to the first base station 10. The RNC may establish E-DCH channels also to other base stations. The E-DCH carries data for at least one radio access bearer (RAB). The E-DCH is used for data and control signalling between the user terminal UE and the core network CN, when the data transmission starts.

At least a first downlink transmission is performed including a first E-DCH channel scheduled grant to the first user terminal (UE), the scheduled grant defining the maximum data rate limit for the uplink data traffic via the first E-DCH.

The first RNC 12 performs a first downlink transmission including a radio link (RL) setup or reconfiguration channel scheduled grant to the first user terminal UE during a RL setup or reconfiguration, before the establishment of the first E-DCH.

In practice, the first RNC 12 configures Node Bs and UEs via radio link (RL) setup/reconfiguration procedures. Then the E-DCH transport channel is configured. The E-DCH can have non-scheduled MAC-d flows (e.g. signalling radio bearer (SRB) used to transmit configuration data to the UE, via the RRC protocol) and these can have a non-scheduled grant, which means this can always be sent. The E-DCH typically also contain a scheduled MAC-d flow (e.g. Interactive service) which can have an initial scheduled grant (SG) (can be zero), but the amount of transmission of this MAC-d flow is under the control of the Scheduler, communication via absolute grants (AG) and relative grants (RG).

A Node B NB, which comprises an enhanced UL scheduler (EUL-S), performs a first downlink transmission including a first E-DCH channel scheduled grant to the first user terminal. There may be more than one Node B in the system performing said step. The scheduled grant defines the maximum scheduled data rate limit for the uplink data traffic via the first E-DCH. The details of the channel scheduled grant will be described later.

The EUL-S is part of the Node B NB, see FIG. 1, which means that it is close to the air interface (WCDMA in HSUPA). It operates on a request-grant principle, where the user terminal UE requests a permission to send data and the scheduler decides when and how much data a user terminal is allowed to send and also how many user terminals that will be allowed to do so. The EUL-S is located in the Node B NB in order to move processing closer to the air interface and be able to react faster on the radio link situation. A particular task of the uplink scheduler is to control the uplink resources, which the user terminal is using.

Node-B is a term used in UMTS to denote the base transceiver station (BTS). In contrast with GSM base stations, Node B NB uses WCDMA as air interface. As in all cellular systems, such as UMTS and GSM, Node B contains transmitter(s) and the receiver(s) used to communicate directly with the mobiles, which move freely around it. Presently, the Node Bs has minimum functionality is controlled by the RNC. Node B transmits signals to RNC. EUL-S as part of Node B triggers E-AGCH/RGCH transmissions to the user terminal, but the decoding and the actual transmission of E-AGCH/RGCH is handled within the Node B. In the following text Node B is described to perform certain procedure, but in practice some procedures by the EUL-S being part of the Node B.

The first user terminal UE calculates a scheduled data rate for the uplink data traffic via the first E-DCH from the received first E-DCH channel scheduled grant. How the scheduled data rate is calculated will be described in relation to the characteristics of the channel scheduled grant. After calculation the first user terminal transmits the uplink data traffic on the first E-DCH, with the calculated scheduled data rate. This means that Node B NB by sending the E-DCH channel scheduled grant can instruct the user terminal about which data rate it is allowed to use.

Figure 2:
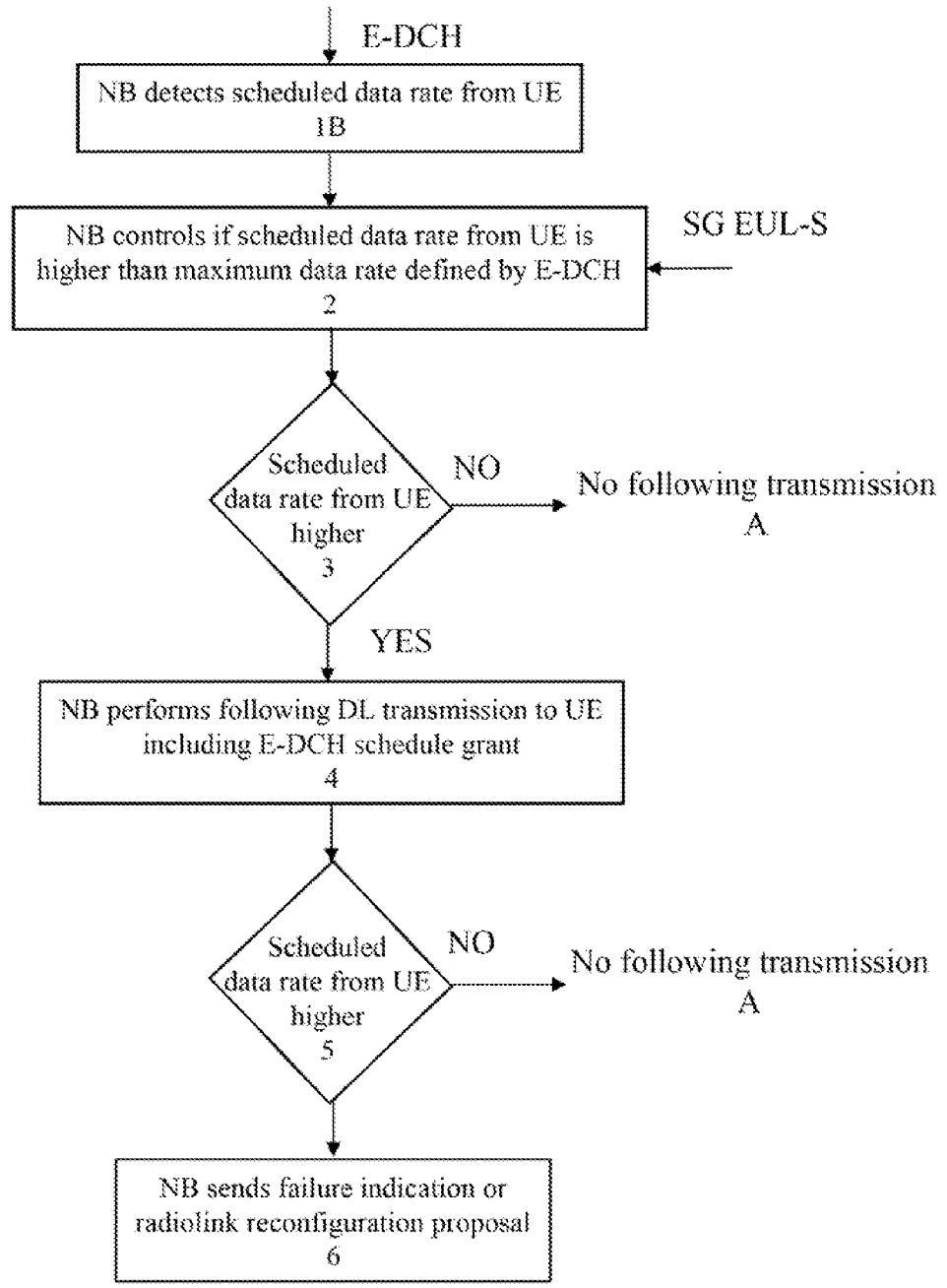
FIG. 2 shows a flow chart for the grant violation detection and transmission of downlink transmissions.

The Node B NB detects 1B the scheduled data rate, on which the first user terminal transmits in order to control the cell load and the risk of interference in the cell. This is shown in FIG. 2 which shows a flow chart for the grant violation detection and transmission of scheduled grants on the downlink. The scheduling enables the system to admit a larger number of high-data rate users and rapidly adapt to interference variations in the cell—leading to an increase both in capacity and the likelihood that a user will experience high data rates. It also enables the system to control that the cell interference are not so high that it causes disturbances in the cell.

The main problem which this invention focuses on is that the user terminal UE sometimes transmits on a too high data rate, which causes disturbances in the cell. This rate is higher than the rate granted by the scheduler. Something needs to be done with the user terminal since the transmitting on a too high rate could seriously disturb the cell.

The present invention solves the above problem by the method steps where the Node B NB first controls 2, see FIG. 2, if the scheduled data rate detected is higher than the maximum data rate SG EUL-S defined by the first E-DCH channel scheduled grant. If the scheduled data rate detected is higher than the maximum data rate, see point 3 in FIG. 2, the Node B NB performs 4 at least a second following downlink transmission including the first E-DCH channel scheduled grant. If the scheduled data rate detected is equal with or lower than the maximum data rate no following transmission is performed, see point A.

The current invention as disclosed provides a control mechanism to make sure that the scheduling decisions are really handled by the user terminal UE. The downlink transmission with the E-DCH channel scheduled grant is repeated, which gives the user terminal a new chance to detect the scheduled grant. It is only repeated when the scheduled data rate detected is higher than the maximum data rate, which means that it is only repeated when necessary.

The first RNC 12 establishes at least one second E-DCH enabling uplink data traffic, with a certain data rate from a second user terminal to the first base station or a second base station. The Node B NB performs a first transmission including a second E-DCH channel scheduled grant to the second user terminal, the scheduled grant defining the maximum scheduled data rate limit for the uplink data traffic via the second E-DCH. This means that there may be more than one E-DCH in the system, for instance between the second user terminal and the first or a second base station. There can only one E-DCH for each user terminal which means that the second E-DCH must be established between a second terminal and the network. The person skilled in the art will therefore realize that the method according to the present invention can be performed for more than one E-DCH.

As shown in FIG. 1 the same E-DCH can be provided both through the first RNC 12, for the serving cell and through a second RNC (RNC2) 13 for the non-serving cell. The second RNC 13 serves a separate base station 10 with a Node B NB2 and an enhanced UL scheduler (EUL-S2) (will be described later). Except for E-AGCH (which can only be transmitted through the serving cell) all the physical channels can be transmitted through either of the cells. As an alternative one RNC can serve both a serving cell and a non-serving cell. The term "Iur" in FIG. 1 represents the interface between the first RNC 12 and the second RNC 13. Only one RNC will communicate with the core network (i.e. the first RNC). The first RNC is in control of the connection and handles things like soft HO.

The E-DCH transport channel is mapped by the E-DCH Dedicated Physical Channel (E-DPDCH), see FIG. 1. The E-DPCCH carries the layer 1 control information associated to the E-DPDCH. E-DPDCH is used to carry the E-DCH transport channel. E-DPDCH and E-DPCCH are always transmitted simultaneously. E-DPCCH shall not be transmitted in a slot unless E-DPDCH is also transmitted in the same slot.

It should be understood by a person skilled in the art that the following steps disclosed from now on, as performed by Node B (NB) 11 can simultaneously be performed by the second Node B (NB2) 10. These steps are performed without control by any of the radio network controllers RNC 12 and RNC2 13.

At least the Node B NB detects the scheduled data rate on the first E-DCH by decoding the data frames of the uplink data traffic. The E-DCH transport block with data is mapped onto one Transmission Time Interval (TTI).

The Node B NB detects the scheduled data rate of the uplink data traffic on the E-DCH by decoding the E-DPDCH and/or the E-DCH Transport Format Combination Indicator (E-TFCI). One of E-DPDCH and E-TFCI or both are used to derive the actual data rate. E-TFCI is a value indicating the size of (i.e. how many bits are contained in) the transport block—the payload unit sent on E-DCH in one TTI.

Figure 5:
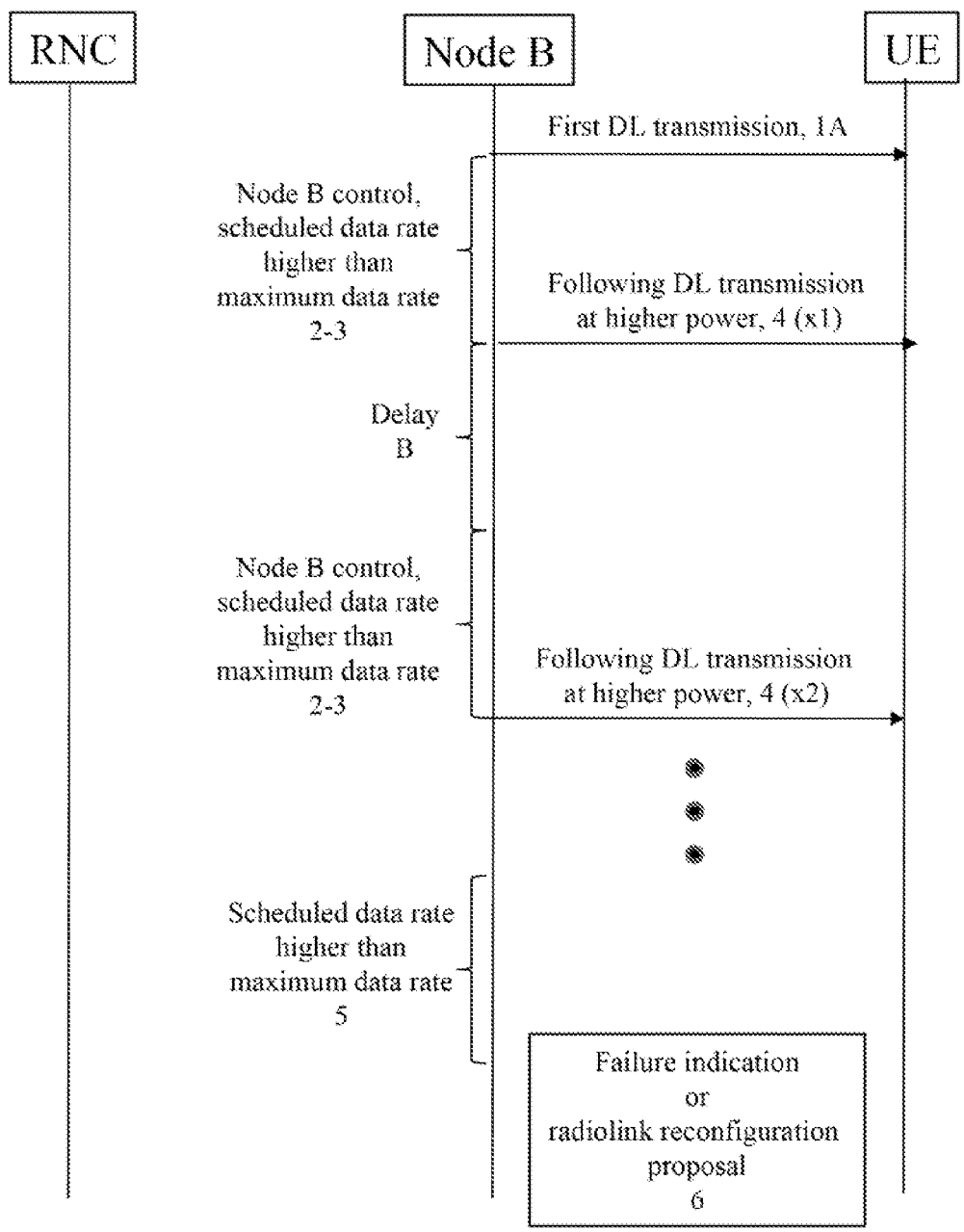
FIG. 5 shows a sequence diagram with the interaction between the first RNC (12), Node B (NB) and the user terminal (UE).

If the scheduled data rate is higher than the maximum data rate after the second following transmission at least the Node B NB performs, at least a third following downlink transmission including the first E-DCH channel scheduled grant, see point 4 in FIG. 2. See also FIG. 5 which shows a sequence diagram with the interaction between the first RNC 12, Node B NB and the user terminal UE. In FIG. 5, point 1A represents the first downlink transmission performed by the Node B. Point 2 (FIGS. 2 and 5) represents the control if the scheduled data rate detected is higher than the maximum data rate. If the scheduled data rate detected is higher than the maximum data rate, see point 3 (FIGS. 2 and 5), the Node B performs 4 (FIGS. 2 and 5) at least a second following downlink transmission including the first E-DCH channel scheduled grant.

In FIG. 5 it is also illustrated that at least Node B NB waits for a period of time, point B, after performing a downlink transmission, after which period it controls again 2 if the scheduled data rate detected is higher than the maximum data rate defined by the first E-DCH channel scheduled grant and whether 3 it should perform 4 a following transmission.

As shown in FIGS. 2 and 5, at least the Node B NB continues to repeat 4 the downlink transmissions more than one time, all the repeated transmissions are named "following transmissions". The third following downlink transmission 4 may be followed by at least one further following downlink transmission 4 including the first E-DCH channel scheduled grant.

The following downlink transmissions are optionally repeated until, point 5 NO/A (FIG. 2), the scheduled data rate detected is equal with or lower than the maximum data rate. There is likelihood that the first user terminal UE finally received the first E-DCH channel scheduled grant and recalculated the scheduled data rate for the uplink data traffic.

As an option the third following downlink transmission 4 is followed by at least one further following downlink transmission until the number of following downlink transmissions reaches a predefined value. This means that at least the Node B NB continues to repeat the downlink transmissions until the predefined value is reached, which may be a pre-stored value for instance set by the operator via a system management user interface.

As an option the following downlink transmission is transmitted at least by the Node B NB, with the same or a higher power level than the previous transmission. Repeating the transmission and particularly with increasing power increases the likelihood that the user terminal UE can detect the first E-DCH channel scheduled grant. The downlink transmission is then followed by at least one further following downlink transmission including the first E-DCH channel scheduled grant until the power level reaches a threshold value.

Figure 3:
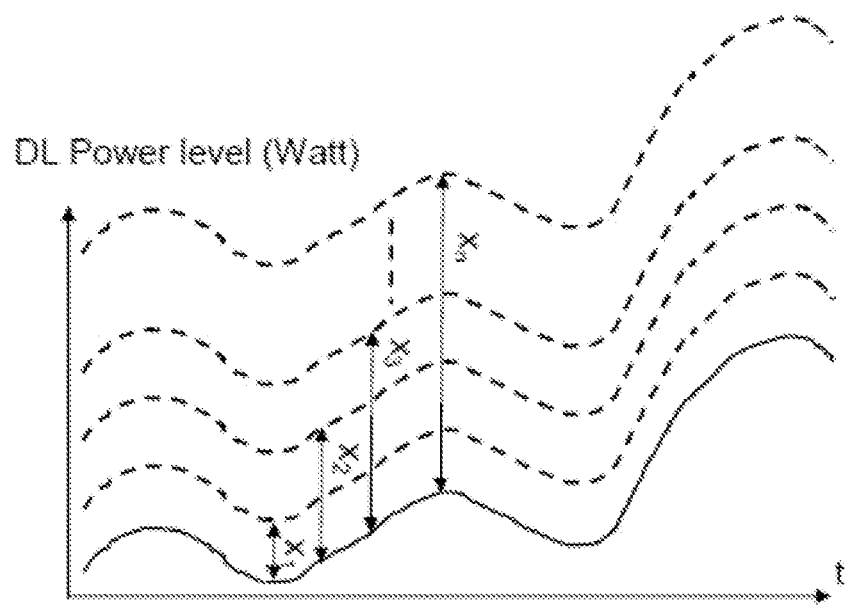
FIG. 3 shows the downlink power level at transmittal of non-repeated respectively repeated grants.

FIG. 3 shows the downlink (DL) power level (Watt) at transmittal of non-repeated respectively repeated scheduled grants, with increasing power level. As shown in the figure the solid line illustrates the option of estimating the power level over time for initial channel scheduled grants, based on prediction of the radio channel or any other DL power control procedure. The estimation is based on the radio conditions, e.g. good radio conditions results in lower power and vice versa. According the 3GPP, 25.414, the E-AGCH and E-RGCH power control is under control of the node B NB. It may e.g. follow the power control commands sent by the UE to the node B or any other power control procedure applied by the node B.

The power level of a repeated scheduled grant transmission is illustrated with dotted lines in FIG. 3. It is derived from the current estimated initial power level plus Xn (see also FIG. 4). The reason for increasing the power level is that the level of the default setting is not sufficient for enabling the user terminal to detect the scheduled grant. Normally increasing values are used for x1, x2, x3 . . . xn. However, other values may also be possible, e.g. setting 0 means repetition without added power.

Figure 4:
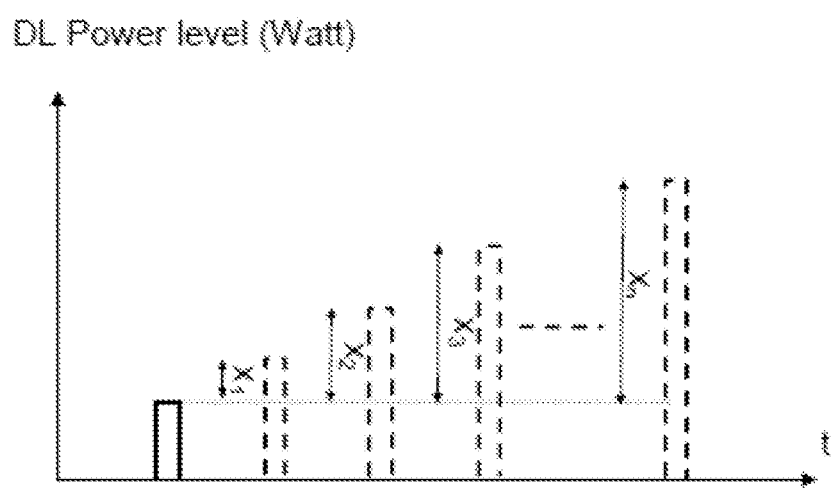
FIG. 4 shows the downlink power level at transmittal of non-repeated respectively repeated grants for the case when the power level is ramped up.

FIG. 4 shows the downlink (DL) power level (Watt) at transmittal of non-repeated respectively repeated scheduled grants for the case when the power level is ramped up from a fixed value represented by the solid line bar. The bars represent the repeated following downlink transmissions according to the present invention. According to the option with increased power level, FIG. 4 shows the first transmission with the fixed value and the repeated following transmissions (dotted line bars), wherein the power is ramped up from the fixed value. Normally increasing values are used for x1, x2, x3 . . . xn. However, other values may also be possible, e.g. setting 0 means repetition without added power. The invention includes all these value settings. The ramped power level is also illustrated in FIG. 5 with x1, x2 and so forth in brackets.

It will now be described what happens if the scheduled data rate, after a predefined number of following downlink transmissions or after the transmitted power level reaches a threshold value, is still higher than the maximum data rate defined by the first E-DCH channel scheduled grant. This is for instance after the number of downlink following transmissions reaches a predefined value. It may also be that the power level reaches a threshold value. As a further alternative the repeating of downlink transmissions has continued for a predefined period of time.

In the following text, Node B (NB) 11 or Node N (NB2) 10 is in contact with only the first RNC 12. The second RNC (13) is transparent and only forwards the information.

The Node B NB initiates 6 (see FIGS. 2 and 5) the sending of a failure indication or the sending of a radiolink reconfiguration proposal to the first RNC 12. A failure indication can be sent for other causes, and in this case the cause for the indication can be called "user terminal not reacting on scheduled grants". This is not the case for the radiolink reconfiguration proposal, which is a new kind of signal. Still the cause for the request can be called "user terminal not reacting on scheduled grants".

There are four alternative solutions how the handle the situation when the scheduled data rate is still higher than the maximum data rate defined by the first E-DCH channel. These are shown in FIGS. 6-9.

Figure 6:
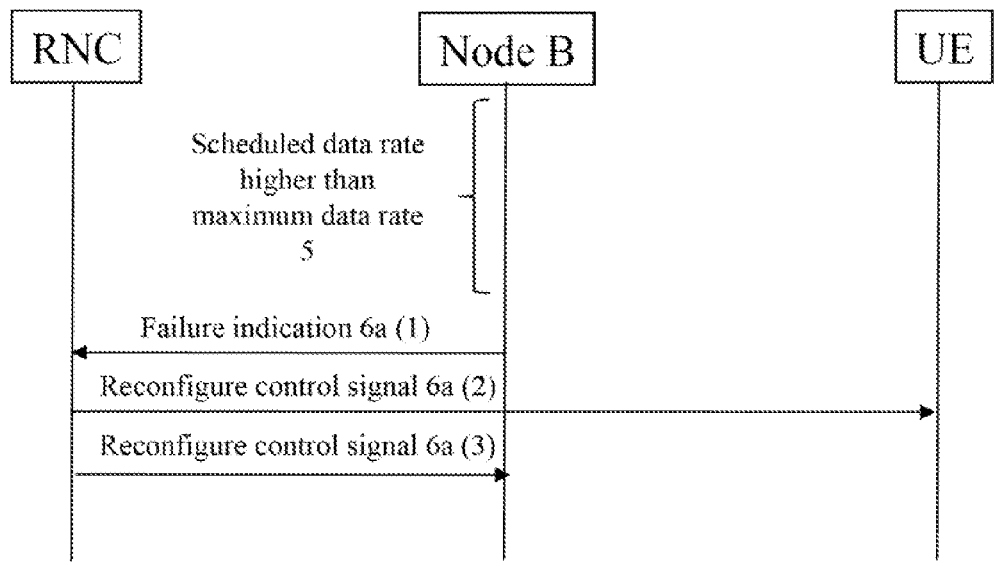
FIG. 6 shows a sequence diagram with the interaction between the first RNC (12), Node B (NB) and the user terminal (UE) where in indicated failure leads to a reconfiguration from E-DCH to DCH.
Figure 9:
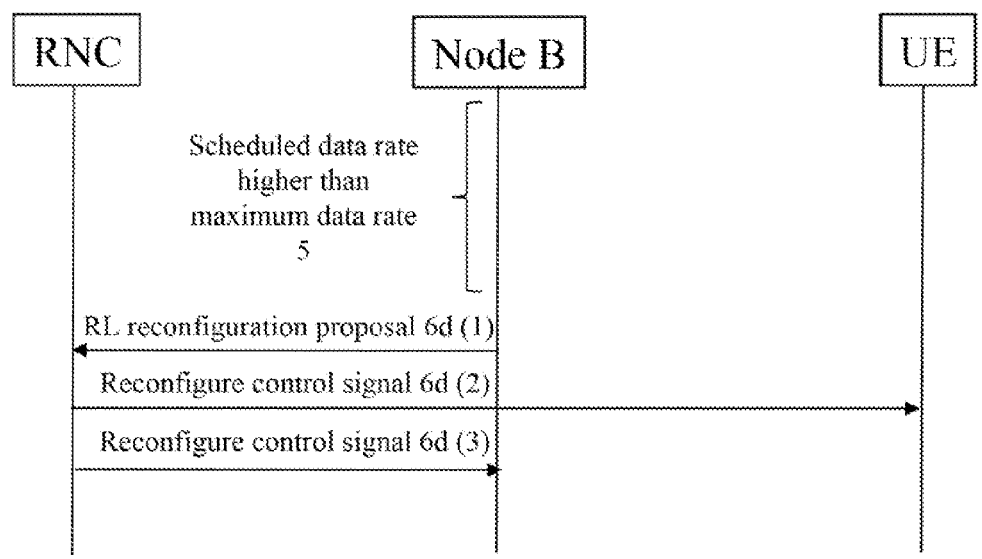
FIG. 9 shows a sequence diagram with the interaction between the first RNC (12), Node B (NB) and the user terminal (UE) where in a RAB configure request leads to a reconfiguration from E-DCH to DCH.

In two alternatives, see FIGS. 6 and 9 at least one RAB is reconfigured by the first RNC 12 from the first E-DCH to a first dedicated channel DCH. The first RNC 12 makes the decision when receiving the failure indication 6a (1) or the radiolink reconfiguration proposal 6d (1). The first RNC 12 then reconfigures at least by sending a reconfigure control signal to the Node B NB 6a (3)/6d (3) and the user terminal UE 6a (2)/6d (2), with instructions to switch from the first E-DCH to the first DCH.

Figure 7:
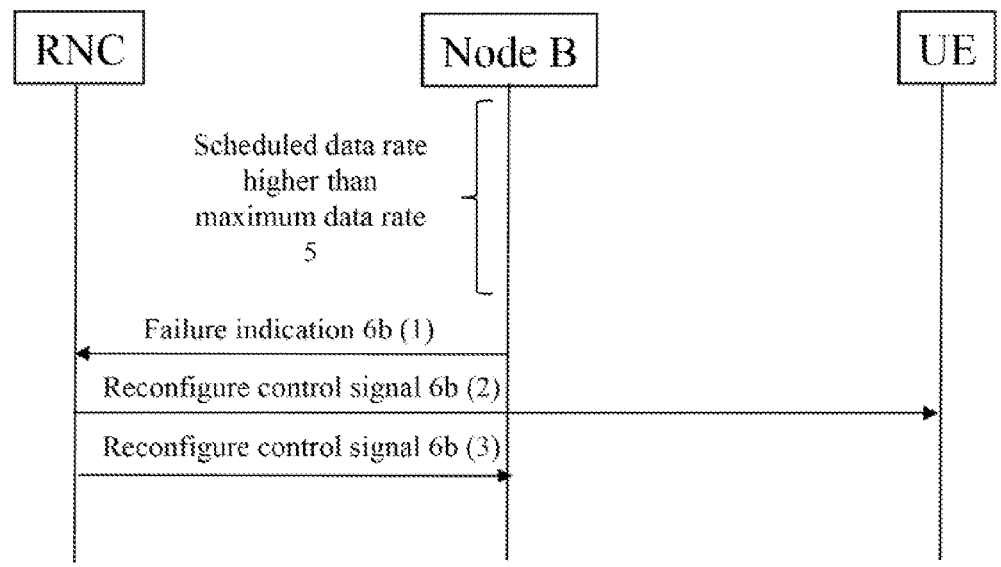
FIG. 7 shows a sequence diagram with the interaction between the first RNC (12), Node B (NB) and the user terminal (UE) where in indicated failure leads to a reconfiguration from E-DCH to FACH.

In one alternative, see FIG. 7, the at least one RAB is reconfigured by the first RNC 12 from the first E-DCH to a first forward access channel (FACH). The first RNC 12 makes the decision when receiving the failure indication 6b (1). The first RNC 12 then reconfigures at least by sending a reconfigure control signal to the Node B NB 6b (3) and the user terminal UE 6b (2), with instructions to switch from the first E-DCH to the first FACH.

The user terminal UE can at any time transmit short packages at the Random Access Channel (RACH) for UL or the FACH for DL. If data is not small then there is a switch to DCH or E-DCH, which in both cases means that the first RNC 12 sends a radio link (RL) Setup to Node B NB and the user terminal. DCH has a fix limit, e.g. 64 kbps service. Then on both UL and DL max 64 kbps can be sent. E-DCH (only UL) can have a minimum rate (a minimum grant) at the configuration. But from that moment it is all controlled by a Node B scheduler involving HARQ re-transmissions on layer 1.

Figure 8:
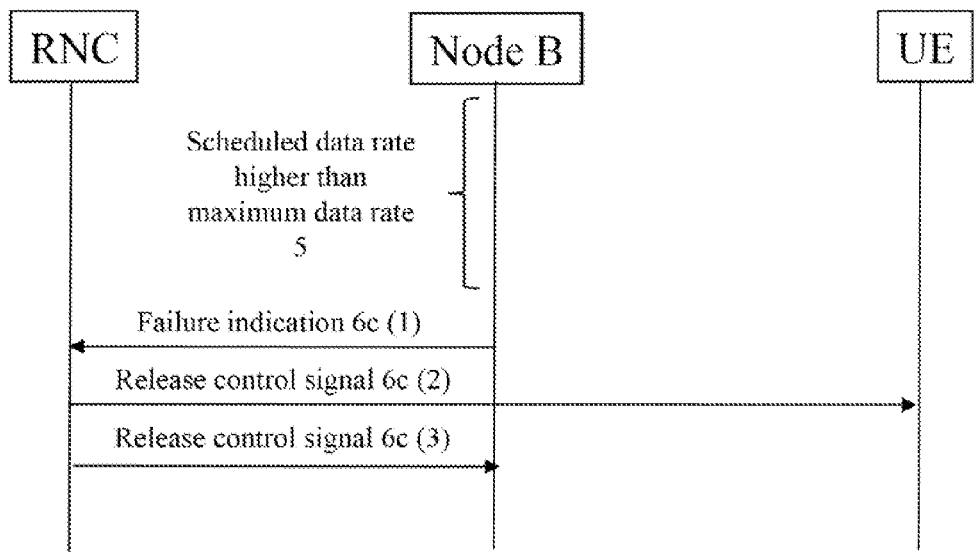
FIG. 8 shows a sequence diagram with the interaction between the first RNC (12), Node B (NB) and the user terminal (UE) where in indicated failure leads to a E-DCH release.

In one alternative, see FIG. 8, the E-DCH is released. The first RNC 12 makes the decision to release the first E-DCH when receiving the failure indication 6c (1). The first RNC 12 the releases the E-DCH by at least sending a release control signal to the Node B NB 6c (3) and the user terminal 6c (2), with instructions to release the first E-DCH.

The E-DCH channel scheduled grant is mapped by the E-DCH Dedicated Physical Channel (E-DPDCH), see FIG. 1. The E-AGCH is transmitted via a serving cell created by the first base station while the E-RGCH is transmitted via the serving cell or at least one non-serving cell created by at least a second base station. Within the scope of the invention the downlink transmissions can be sent as an absolute scheduled grant using E-AGCH, but it can also be sent as a serving (from the serving cell) relative scheduled grant or non-serving (from a non-serving cell) relative scheduled grant using E-RGCH.

In some cases there might not be enough decoding resources in the Node B NB to handle the scheduled rate used by the UE since it is too high and then data (e.g. TCP/IP) will not come through which will cause congestion and the UE will finally stop transmitting. But in other scenarios there might be available decoding resources and decoding can then be performed in spite of too high scheduled rate. The problem with this is that this UE causes more UL air interface cell interference than allowed, which can cause difficulties to detect other channels. An option is then that the EUL Scheduler informs the decoding resources and order this processing unit to drop transmission which is higher than allowed, which will finally make the UE stop transmitting.

The embodiments refer to a method and a telecommunication system for grant violation detection and Node B and a radio network controller in the system enabling said method. The system, Node B and the radio network controller in the system are adapted to perform the method steps as described in the method.

Node B NB is adapted for grant violation detection in the enhanced UL telecommunication system further comprising at least the first base station 11 enabling wireless communication with at least the first user terminal UE. The Node B is further adapted for detecting 1B a scheduled data rate on which the first user terminal UE transmits uplink data traffic on the first E-DCH. What particularly characterizes Node B is that it is adapted to control if the scheduled data rate detected is higher than the maximum data rate, defined by the first E-DCH channel scheduled grant. If the scheduled data rate detected is higher than the maximum data rate, the Node B is further adapted to perform at least the second following downlink transmission including the first E-DCH channel scheduled grant.

The radio network controller (RNC) in the enhanced UL telecommunication system is adapted for grant violation detection. At least the first RNC is adapted for establishing at least the first enhanced UL transport channel (E-DCH) enabling uplink data traffic, with a certain data rate from the first user terminal UE at least to the first base station. What particularly characterizes the first RNC is that it is further adapted for receiving a failure indication or a radiolink reconfiguration proposal sent to the first RNC, after initiation by the Node B NB.

The enhanced uplink telecommunication system is adapted for grant violation detection. In the system at least one first radio network controller RNC is adapted to establish at least the first enhanced UL transport channel (E-DCH), which enables uplink data traffic with a certain data rate from the first user terminal UE at least to the first base station. The first user terminal is adapted to calculate from the received first E-DCH channel scheduled grant the scheduled data rate for the uplink data traffic via the first E-DCH. The first user terminal is further adapted to transmit the uplink data traffic on the first E-DCH with the calculated scheduled data rate. The Node B NB in the system is adapted to then detect the scheduled data rate on which the first user terminal transmits. What particularly characterizes the system is that Node B is adapted to control if the scheduled data rate detected is higher than the maximum data rate defined by the first E-DCH channel scheduled grant. If the scheduled data rate detected is higher than the maximum data rate, the Node B is further adapted to perform at least a second following downlink transmission including the first E-DCH channel scheduled grant.

The present invention is not limited to the embodiments described above and may be varied freely within the scope of the appended claims.

The invention claimed is:

1. A method for grant violation detection in an enhanced uplink (UL) telecommunication system comprising at least one Node B (NB) for enabling wireless communication with at least one user terminal, the method comprising:
    establishing, with at least one first radio network controller (RNC), at least a first enhanced UL transport channel (E-DCH) enabling uplink data traffic with a certain data rate from the first user terminal (UE) at least to the first Node B (NB), the first E-DCH carrying data for at least one radio access bearer (RAB),
    performing at least a first downlink transmission including a first E-DCH channel scheduled grant to the first user terminal (UE), the scheduled grant defining a maximum data rate limit for the uplink data traffic via the first E-DCH,
    calculating, with the first user terminal (UE), a scheduled data rate for the uplink raffle via the first E-DCH from the received first E-DCH channel scheduled grant,
    transmitting, from the first user terminal (UE), the uplink data traffic on the first E-DCH with the calculated scheduled data rate,
    detecting, at the Node B (NB), the scheduled data rate on which the first user terminal (UE) transmits, and
    in response to detecting that the scheduled data rate is higher than the maximum data rate defined by the first E-DCH channel scheduled grant, performing with the Node B at least a second following downlink transmission that includes the first E-DCH channel scheduled grant, wherein the second following downlink transmission is transmitted by the Node B (NB) with a higher power level than the first downlink transmission.

2. The method according to claim 1 further comprising:
    in response to detecting that the scheduled data rate is higher than the maximum data rate after the second following transmission, performing with the Node B (NB) at least a third following downlink transmission including the first E-DCH channel scheduled grant.

3. The method according to claim 2 wherein the third following downlink transmission is followed by at least one further following downlink transmission including the first E-DCH channel scheduled grant until the scheduled data rate detected is equal with or lower than the maximum data rate.

4. The method according to claim 2 wherein the third following downlink transmission is followed by at least one further following downlink transmission until the number of following downlink transmissions reaches a predefined value.

5. The method according to claim 1 wherein the second following downlink transmission is followed by at least one further following downlink transmission including the first E-DCH channel scheduled grant until the power level reaches a threshold value.

6. The method according to claim 1 further comprising:
waiting for a period of time after performing a downlink transmission,
after waiting the period, performing with the Node B at least a third following downlink transmission that includes the first E-DCH channel scheduled grant if the scheduled data rate detected is higher than the maximum data rate defined by the first E-DCH channel scheduled grant.

7. The method according to claim 1 further comprising:
If the scheduled data rate after a predefined number of following downlink transmissions or after the transmitted power level reaches a threshold value is still higher than the maximum data rate defined by the first E-DCH channel scheduled grant, initiating, with the Node B, the sending of a failure indication or the sending of a radiolink reconfiguration proposal to the first RNC.

8. The method according to claim 7 further comprising:
deciding, with the first RNC, to reconfigure the at least one RAB from the first E-DCH to a first dedicated channel (DCH) when receiving a failure indication or a radiolink reconfiguration proposal, and
reconfiguring, with the first RNC, at least by sending a reconfigure control signal to the Node B (NB) and the user terminal (UE) with instructions to switch from the first E-DCH to the first DCH.

9. The method according to claim 7 further comprising:
deciding, with the first RNC, to reconfigure the at least one RAB from the first E-DCH to a first forward access channel (EACH) when receiving a failure indication, and
reconfiguring, with the first RNC, at least by sending a reconfigure control signal to the Node B (NB) and the user terminal (UE) with instructions to switch from the first E-DCH to the first EACH.

10. The method according to claim 7 further comprising:
deciding, with the first RNC, to release the first E-DCH when receiving a failure indication, and
releasing, with the first RNC, at least by sending a release control signal to the Node B (NB) and the user terminal (UE) with instructions to release the first E-DCH.

11. A Node B (NB) being configured for grant violation detection in an enhanced UL telecommunication system comprising:
at least one Node B (NB) for enabling wireless communication with at least one first user terminal (UE),
the Node B (NB) being configured for establishing at least a first enhanced UL transport channel (E-DCH) enabling uplink data traffic with a certain data rate from the first user terminal (UE) to the Node B (NB), the first E-DCH carrying data for at least one radio access bearer (RAB),
the Node B (NB) further being configured for performing at least a first downlink transmission including a first E-DCH channel scheduled grant to the first user terminal (UE), the scheduled grant defining a maximum data rate limit for the uplink data traffic via the first E-DCH,
the Node B (NB) further being configured for detecting a scheduled data rate on which the first user terminal (UE) transmits uplink data traffic on the first E-DCH, and
if the scheduled data rate detected is higher than the maximum data rate, the Node B (NB) is further configured for performing at least a second following downlink transmission including the first E-DCH channel scheduled grant, where the Node-B is configured for transmitting the second following downlink transmission with a higher power level than the first downlink transmission.

12. The Node B (NB) according to claim 11 wherein if the scheduled data rate is higher than the maximum data rate after the second following transmission the Node B (NB) is further configured for performing at least a third following downlink transmission including the first E-DCH channel scheduled grant.

13. The Node B (NB) according to claim 11 wherein the Node B (NB) is further configured for waiting for a period of time after performing a downlink transmission, after which period the Node B performs at least a third following downlink transmission that includes the first E-DCH channel scheduled grant if the scheduled data rate detected is higher than the maximum data rate defined by the first E-DCH channel scheduled grant.

14. The Node B (NB) according to claim 11 wherein if the scheduled data rate after a predefined number of following downlink transmissions or after the transmitted power level reaches a threshold value is still higher than the maximum data rate defined by the first E-DCH channel scheduled grant, the Node B (NB) is further configured for initiating the sending of a failure indication or the sending of a radiolink reconfiguration proposal to a first radio network controller (RNC).

15. An enhanced uplink telecommunication system configured for grant violation detection, the system comprising:
at least one first Node B (NB) for enabling wireless communication with at least one first user terminal (UE), the first Node B (NB) being configured for performing a first downlink transmission including a first E-DCH channel scheduled grant to the first user terminal (UE), the scheduled grant defining a maximum data rate limit for the uplink data traffic via the first E-DCH,
at least one first radio network controller (RNC) being configured for establishing at least a first enhanced UL transport channel (E-DCH) enabling uplink data traffic with a certain data rate from the first user terminal (UE) at least to the first Node B (NB), the first E-DCH carrying data for at least one radio access bearer (RAB),
the first user terminal (UE) being configured for calculating a scheduled data rate for the uplink data traffic via the first E-DCH from the received first E-DCH channel scheduled grant,
the first user terminal (UE) further being configured for transmitting the uplink data traffic on the first E-DCH with the calculated scheduled data rate,
the first Node B (NB) further being configured for detecting the scheduled data rate on which the first user terminal (UE) transmits, and
the first Node B (NB) further being configured for controlling if the scheduled data rate detected is higher than the maximum data rate defined by the first E-DCH channel scheduled grant, wherein if the scheduled data rate detected is higher than the maximum data rate, the Node B (NB) is further configured for performing at least a second following downlink transmission including the first E-OCH channel scheduled grant, where the Node-B is further configured for transmitting the second following downlink transmission with a higher power level than the first downlink transmission.

* * * * *

UNITED STATES PATENT AND TRADEMARK OFFICE
CERTIFICATE OF CORRECTION

PATENT NO. : 8,345,613 B2
APPLICATION NO. : 12/682321
DATED : January 1, 2013
INVENTOR(S) : Ankel et al.

It is certified that error appears in the above-identified patent and that said Letters Patent is hereby corrected as shown below:

In the Drawings:

In Fig. 1, Sheet 1 of 6, delete "FIG" and insert -- FIG. --, therefor at each occurrence throughout the drawings.

In the Specifications:

In Column 1, Line 22, delete "(UMTS)," and insert -- (UMTSs), --, therefor.

In Column 1, Lines 37-38, delete "division (FDD) and Time division" and
insert -- Division Duplex (FDD) and Time Division Duplex --, therefor.

In Column 3, Line 6, delete "Dedicated" and insert -- Dedicated Physical --, therefor.

In Column 3, Line 25, delete "Absolute" and insert -- Absolute Grant --, therefor.

In Column 6, Line 28, delete "E-DCH," and insert -- E-DCH. --, therefor.

In Column 7, Line 65, delete "a E-DCH" and insert -- an E-DCH --, therefor.

In Column 8, Line 62, delete "(AG) and relative grants (RG)." and
insert -- (AGs) and relative grants (RGs). --, therefor.

In Column 10, Line 39, delete "Physical" and insert -- Physical Data --, therefor.

In Column 12, Line 41, delete "how the" and insert -- how they --, therefor.

In Column 13, Line 12, delete "Physical" and insert -- Physical Data --, therefor.

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 8,345,613 B2

In the Claims:

In Column 14, Line 40, in Claim 1, delete "raffle" and insert -- data traffic --, therefor.

In Column 15, Line 19, in Claim 7, delete "If" and insert -- if --, therefor.

In Column 15, Line 38, in Claim 9, delete "(EACH)" and insert -- (FACH) --, therefor.

In Column 15, Line 43, in Claim 9, delete "(EACH)." and insert -- (FACH). --, therefor.

In Column 16, Line 62, in Claim 15, delete "E-OCH" and insert -- E-DCH --, therefor.